United States Patent
Feder et al.

(10) Patent No.: US 9,191,437 B2
(45) Date of Patent: Nov. 17, 2015

(54) OPTIMIZING DATA STORAGE AMONG A PLURALITY OF DATA STORAGE REPOSITORIES

(75) Inventors: Oshrit Feder, Kfar-Saba (IL); Abel Gordon, Haifa (IL); German Goft, Pardes Hana-Karkur (IL)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 12/633,924

(22) Filed: Dec. 9, 2009

(65) Prior Publication Data
US 2011/0137870 A1 Jun. 9, 2011

(51) Int. Cl.
*H04L 29/08* (2006.01)
*G06F 17/30* (2006.01)

(52) U.S. Cl.
CPC ........ *H04L 67/1002* (2013.01); *G06F 17/3015* (2013.01)

(58) Field of Classification Search
CPC .................................................. G06F 17/3015
See application file for complete search history.

(56) References Cited

U.S. PATENT DOCUMENTS

| | | | | |
|---|---|---|---|---|
| 7,890,626 | B1 * | 2/2011 | Gadir ............................. | 709/224 |
| 2005/0076136 | A1 * | 4/2005 | Cho et al. ...................... | 709/231 |
| 2005/0080810 | A1 * | 4/2005 | Matsuura ....................... | 707/102 |
| 2007/0038697 | A1 * | 2/2007 | Zimran et al. ................. | 709/203 |
| 2007/0079171 | A1 * | 4/2007 | Aidun .............................. | 714/6 |
| 2009/0132619 | A1 * | 5/2009 | Arakawa et al. .............. | 707/205 |
| 2010/0125553 | A1 * | 5/2010 | Huang et al. .................. | 707/661 |

OTHER PUBLICATIONS

Yi-Fang Lin et al., "Optimal placement of replicas in data grid environments with locality assurance", Parallel and Distributed Systems, 2006. ICPADS 2006. 12th International Conference on vol. 1, Issue, 0-0 0 Page(s):8 pp.—Digital Object Identifier 10.1109/ICPADS. 2006.74.
Xiong Fu et al., "A replica placement algorithm in mobile grid environments", Proceedings of the 2009 International Conference on Embedded Software and Systems—vol. 00. pp. 601-606.
Zhang Junhu et al., "QCMR-DG: distributed self-adaptive replica distribution algorithm based on an implicit QoS—cluster mapping for data grids", Journal of Huazhong University of Science and Technology (Nature Science). Year 2005, Issue z1, p. 11-14.
XiaoLi Zhou et al., "ReCon: A Fast and Reliable Replica Retrieval Service for the Data Grid", Cluster Computing and the Grid, 2006. CCGRID 06. Sixth IEEE International Symposium on vol. 1, Issue, May 16-19, 2006 pp. 446-453.
Wei Fu et al., "CPI: A Novel Three-Phase Algorithm for QoS—Aware Replica Placement Problem", Book—Network and Parallel Computing. ISSN—0302-9743 (Print) 1611-3349 (Online). vol. 5245/2008. Oct. 11, 2008.
Wei Fu et al., "QoS—Guaranteed Ring Replication Management with Strong Consistency", Book Title—Advances in Web and Network Technologies, and Information Management. ISSN—0302-9743 (Print) 1611-3349 (Online). vol. 4537/2007. Aug. 22, 2007.

* cited by examiner

*Primary Examiner* — Haroon Hasan
(74) *Attorney, Agent, or Firm* — Ziv Glazbarg, Esq.

(57) ABSTRACT

Machines and methods for optimizing data storage among a plurality of data storage repositories are provided. The method comprises processing a data request submitted for storing data on one or more data storage mediums; determining whether duplicate copies of the data are to be maintained on more than one storage medium so that established quality of service requirements are met; and managing duplicate copies of the data on said one or more data storage mediums to meet the established quality of service requirements while servicing the data request.

29 Claims, 5 Drawing Sheets

OPTIMIZING DATA STORAGE AMONG A PLURALITY OF DATA STORAGE REPOSITORIES

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to data storage and, more particularly, to optimizing data storage among a plurality of data storage repositories in a communication network.

BACKGROUND

In a data storage environment, more than one copy of the same data may be stored in different data repositories. Such redundancy is typically needed to support data mining and recovery (e.g., backup or archive services) or to promote system efficiency (e.g., the duplicate copies may be needed for the purpose of concurrent processing). Accordingly, the stability and the quality of service (QoS) in a system may be directly dependent on a structured data redundancy level.

On the other hand, maintaining the resources to support the storage and accessibility of redundant data is expensive. To control costs, optimization techniques such as deduplication are generally used to reduce the amount of redundant data. Duplicate data items may be reduced to single instances to save storage resources. Depending on QoS requirements and system implementation, however, several copies of the same data may need to be retained, despite of the desire to minimize duplication.

Thus, the challenge is to maintain the proper balance in storage optimization without affecting the QoS requirements. For example, where the QoS requirements for the same data across multiple computing platforms is not identical, the global application of a common deduplication technique will be counterproductive, and will adversely affect the QoS. As such, an optimization technique is needed that can support different data storage services across different platforms and help limit data storage costs, without compromising QoS for the provided services.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for optimizing data storage among a plurality of data storage repositories is provided. The method comprises processing a data request submitted for storing data on one or more data storage mediums; determining whether duplicate copies of the data are to be maintained on more than one storage medium so that established quality of service requirements are met; and managing duplicate copies of the data on said one or more data storage mediums to meet the established quality of service requirements while servicing the data request.

In accordance with one aspect of the invention, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
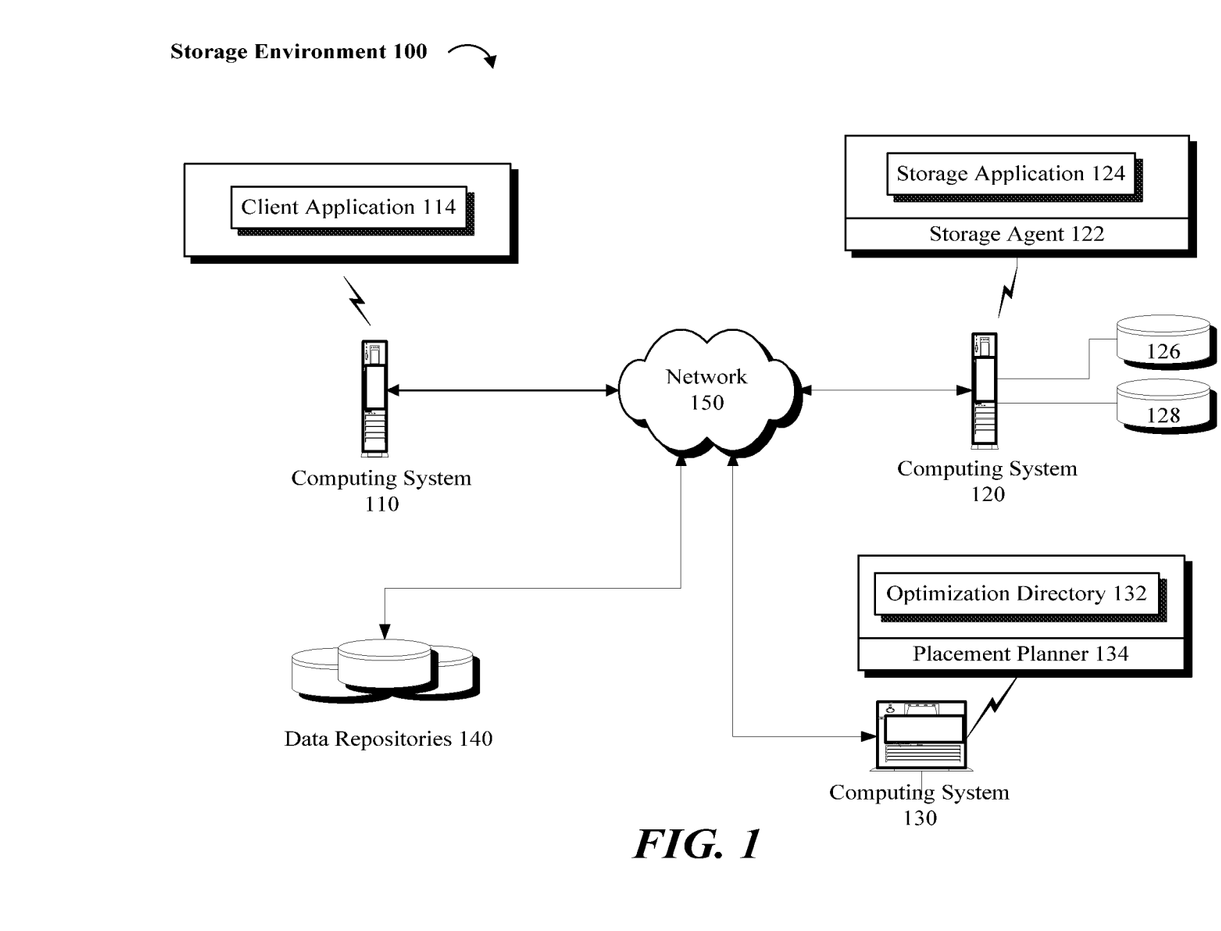
FIG. 1 illustrates an exemplary storage environment in accordance with one or more embodiments.

Referring to FIG. 1, an exemplary storage environment 100 is illustrated in which computing systems 110, 120 and 130 communicate over a network 150. A client application 114 may be executed on computing system 110, wherein the client application 114 submits storage requests to store, remove or retrieve data from one or more data repositories 140 connected to network 150. A storage application 124 executed on computing system 120 may be utilized to service the storage requests submitted by client application 114. The storage application 124, for example, may function either individually or in conjunction with other storage applications (not shown in FIG. 1) to service the submitted storage requests.

In one embodiment, a storage agent 122 is executed on computing system 120 or other computing system connected to network 150 to help process storage requests submitted to storage application 124 in an effort to optimize data storage on data repositories 140 as provided in further detail below. Depending on implementation a storage medium 126 and a meta data repository 128 may be connected to the network 150 or optionally to computing system 120 over which storage agent 122 is operational. To achieve low latency thresholds, it may be desirable for storage agent 122 to have a locally accessible storage medium 126 and meta data repository 128.

Meta data repository 128 may be configured to retain information about data items (e.g., data particles or data chunks) which are the subject of one or more storage requests submitted to the storage application 124. In other words, storage agent 122 may be utilized to intercept the storage requests submitted to the storage application 124 for the purpose of attaining system optimization. Optimization in this context, without limitation, refers to methods or mechanisms utilized to reduce data redundancy in the data repositories 140 in consideration to the respective QoS and costs associated with storing data in said data repositories 140 or the related storage resources.

Storage medium 126 may be configured as a minimal latency storage medium (e.g., a cache) accessible by storage agent 122 for temporary storage of data, which is the target of a submitted storage request, until the optimal location for storing the target data is determined. The target data may include data that is to be stored in a data repository 140 as provided via a data storage request submitted by client application 114 or data that is to be retrieved, moved or removed from a data repository 140 pursuant to a submitted storage request. Data repository 140 may be implemented over a distributed or non-distributed platform, depending on implementation.

In one or more embodiments, computing system 130 is configured to, optionally, provide a central point of service wherein an optimization directory 132 is maintained. The optimization directory may be implemented in the form of a table, a registry, a list, an array, a linked list, a B-tree or any other computational or relational data structure that may be utilize to hold and organize data. The data may be registered in the optimization directory 132 in a format suitable for tracking, mapping or indexing records and entries associated with submitted storage requests and the respective target data, based on information provided by the storage agent 122, for example. Optimization directory 132 may include a reference to the different locations where the target data is currently stored and also to the related QoS information for the target data or an application using the target data.

In the exemplary storage environment 100 illustrated in FIG. 1, a placement planner 134 may be implemented as an application or a process that is, optionally, executed on computing system 130 to determine the optimal storage location or locations for target data based on information stored in optimization directory 132, or based on information provided by storage agent 122, or a combination of the two. Placement planner 134 provides instructions to storage agent 122 on where to store or move copies of the target data. Based on the information provided by placement planner 134 and storage agent 122, the optimization directory 132 may be utilized to retain a mapping of QoS associated with the target data and the respective data items, and the storage location of the data items across the storage environment 100. Optimization directory 132 or placement planner 134 may be implemented over a distributed or non-distributed platform, depending on implementation.

Target data with redundant or similar data items may originate from different client applications 114 that have different QoS requirements. Placement planner 134 is configured to determine, in the most economical way, a data optimization solution that desirably satisfies a majority, if not all, of the QoS requirements. As provided in further detail below, the placement planner 134 may use information (e.g., meta data indicating QoS requirements) associated with the target data, or other information related to client application 114, storage application 124, or data repositories 140 to determine how and where to store the target data, and whether to move the target data from one data repository to another.

Depending on QoS requirements, for example, the target data may be stored in duplicate at different data repositories 140, and for example at different storage levels or resources such as local storage (e.g., memory, hard drive, solid state device), backup storage (e.g., local tape drive), archive storage (e.g., remotely located hard drives or tape drives), off-site disaster recovery storage (e.g., hard drives, tape drives, CD ROM, a combination of different storage mediums). Duplication of data provides for a more resilient and dependable data storage system.

In some embodiments, QoS guidelines may be defined for different types of data, or based on the type of client applications 114 that is to process said data. To meet said QoS requirements, duplicates of certain data may be stored at a plurality of storage resources or data repositories 140. For example, client applications for high priority customers or client applications with high sensitivity or low latency QoS requirements may store the data at multiple storage resources and in relationship with the access speed associated with each storage resource.

As noted earlier, to optimize data storage environment 100, it is desirable to minimize storage costs, by identifying the duplicate data and eliminate the duplication, without affecting the QoS level for one or more client applications 114. To accomplish this, storage agent 122 is implemented to intercept data storage requests received from client applications 114 to determine an optimal data storage and redundancy management strategy by referring to records in the optimization directory 132. Desirably, the records in optimization directory 132 track the data storage locations where duplicative data is stored and the QoS statistics associated with each location.

The functionality for determining or maintaining the optimum storage policy and redundancy management strategy may be implemented in a central or distributed manner. For example, in some embodiments, a central or distributed system (e.g., placement planner 134) may be utilized to collaborate with the storage agent 122 to determine the most optimal data storage strategy based on information provided from the storage agent 122 and optimization directory 132. In this implementation, the placement planner 134 determines the most optimum storage strategy and informs the storage agent 122 of that strategy. In other words, the placement planner 134 determines which data storage resources are or are not pertinent for maintaining the QoS for target data based on optimization policies that are either pre-existing or are calculated or designated in real-time.

Depending on implementation, the instructions to retain, copy or remove data from different storage resources may be provided by way a vector mechanism. For example, if four storage resources are available in the global storage environment, then a vector having four bits can be used to identify the location in which the target data is to be stored for achieving optimal results. For instance, a vector with the value '1001' may indicate to the storage agent 122 that the duplicate data is to be copied to the first and fourth storage resources and removed, if any, from the second and third storage resources.

The mechanism or process for determining what is an effective optimization result may vary depending on how the QoS is defined for each client application 114, the type of the target data, the system bandwidth, the latency associated with accessing data on the storage resources, and so on. For example, if QoS is associated with maximizing data access speeds (i.e., reducing data access latency), the optimization mechanism or process may be configured to determine the smallest common denominator (i.e., the intersection) for the applicable data storage resources, such that the fastest storage resource retains a copy of the target data and the other copies are removed.

On the other hand, if the QoS is to preserve data reliability and system resilience, then the optimization mechanism or process may be configured to determine the largest common denominator (i.e., the union) of the corresponding storage resources to guarantee that data loss or corruption at one or more storage resources will not substantially affect the QoS for the entire system. Some implementations may utilize a mechanism or process configured to maintain the QoS for a combination of factors that may affect the availability of data. Such factors may include access speed, resilience, the associated optimization costs with respect to availability of bandwidth, storage capacity, or even electrical costs associated with retrieving, deleting, and copying data across the storage environment 100.

The optimization process may take place by temporarily storing the target data at storage medium 126, until the placement planner 134 has determined the most optimum configuration for storing the data across the storage platform illustrated in FIG. 1. Alternatively, the optimization process may take place in the background by allowing the storage agent 122 to, upon intercepting the data, take on a best efforts approach to store the target data at one of the more appropriate data storage repositories, and allowing the placement planner 134 to later change the storage location based on analyzing the data in the optimization directory 132 as provided in further detail below.

Figure 2:
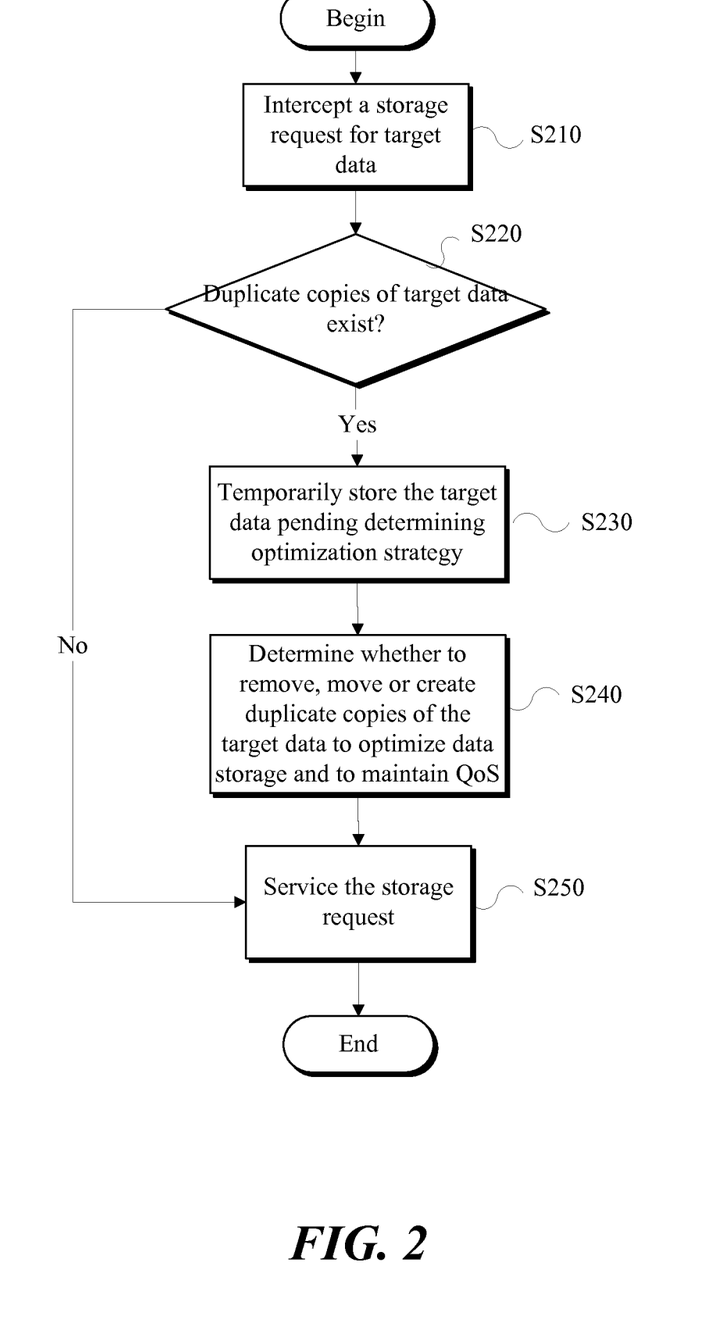
FIG. 2 is a flow diagram of a method for data optimization in the storage environment of FIG. 1, in accordance with one embodiment.

Referring to FIGS. 1 and 2, storage agent 122 may intercept a storage request (e.g., a store or delete request) (S210), in response to a storage request for target data submitted by client application 114. In one embodiment, it is determined if duplicate copies of the target data exist (S220). If not, the storage request is submitted to storage application 124 for processing (S250). If duplicate copies of the target data exist, however, storage agent 122 may temporarily store the related data items in storage medium 126, pending a determination of optimization strategy (S230). In certain embodiments, storage agent 122 temporarily stores the related data items in storage medium 126 regardless of whether or not duplicate copies exists for target data.

Depending on implementation, storage agent 122 may add to or update the meta data repository 128 with the meta data associated with the target data. Storage agent 122 may further update optimization directory 132 with information about QoS requirements for a particular type of data (e.g., the target data to be serviced) or the data locations where duplicate copies of the target data are stored, based on the meta data associated with the target data. Storage agent 122 may also notify the placement planner 134 and submit a request to determine whether and how to remove, move or create duplicate copies of the target data to optimize data storage while maintaining the QoS (S240). According to the guidance provided by the placement planner 134, the storage request may be serviced by the storage agent 122 or the storage application 124 (S250).

Placement planner 134, in one embodiment, is configured to consult with optimization directory 132 and calculate one or more cost efficient locations to copy, move or remove the target data, according to a cumulative strategy that optimizes QoS, the storage cost, or storage efficiency of the data storage system either globally or by designation. Optionally, placement planner 134 may request that storage agent 122 copy, delete or move data items at different storage locations (e.g., data repositories) according to an optimization policy by way of using a vector mechanism, for example, as provided earlier.

In summary, in one embodiment, storage agent 122 stores the target data in a temporary storage medium 126 and notifies the placement planner 134 about the target data and the associated QoS. The QoS information may be provided, for example, by the client application 114 in the form of meta data associated with the target data. The placement planner 134 depending on an optimization policy and based on information in optimization directory 132 determines whether the existing storage status of the target data already satisfies respective QoS. If, for example, the QoS is not satisfied based on the existing number of data copies or locations where the data is stored, then the placement planner 134 determines the storage locations for the target data and the number of duplicate copies such that the QoS is best satisfied. Depending on the associated costs, placement planner 134 may issue a series of directives or suggestions to storage agent 122 or storage application 124, or both on how to meet the QoS by retrieving, removing or copying data in different storage locations across the storage platform.

In one embodiment, in addition to the costs of retrieving, deleting and copying data across the storage platform, retention cost are also considered. The retention cost refers to the cost of storing a data item at a certain storage location or medium. For example, storing a data item in a low latency disk drive (e.g., latency <100 ms) may cost $X per mega byte per day. If the QoS requirements or the retention costs change, placement planner 134 decides whether the retention policy may be modified so that the data storage is managed using a less expensive cost alternative. For example, one option may include considering the cost of the move operation while trying to meet other QoS requirements.

In one embodiment, QoS may be determined based on a combination of different factors that affect the QoS for a data item. For example, a data item may be stored in a set of different locations to comply with two factors simultaneously. For instance, a first QoS factor may be to support a retrieval latency of at most 100 ms for data type A, and a second QoS factor may be to support disaster recovery by having at least three locations from which backup copies of the data of type A may be retrieved. In such scenario, a QoS vector may be represented by [(latency <100 ms); (disaster recovery=1)], for example. To meet the first QoS factor, the data item may be stored in a first local low latency hard disk with relatively high retention cost, for example. And, to meet the second QoS factor, the data item may be stored in, for example, two or more other hard disks of equal or lower latency. As such, the associate retention costs are minimized while still satisfying the designated QoS requirements.

In one embodiment, information recorded in the optimization directory 132 about the QoS and the locations where certain data is stored may be updated after a storage request is serviced. It is noteworthy that in some embodiments the placement planner 134 is utilized to determine the optimal storage strategy about where and how to store the target data prior to servicing a storage request. In an alternative embodiment, the storage request may be serviced first and the placement planner 134 may determine the proper strategy for the placement and duplication of the target data at a later time. The latter implementation may be utilized where relatively long latencies for servicing a storage request are not tolerable. Some other factors which may be taken into consideration are the availability of bandwidth at the time a storage request is received. For example, if a request is received during a high traffic volume period, then it may be desirable to perform the optimization task in the background.

Figure 3:
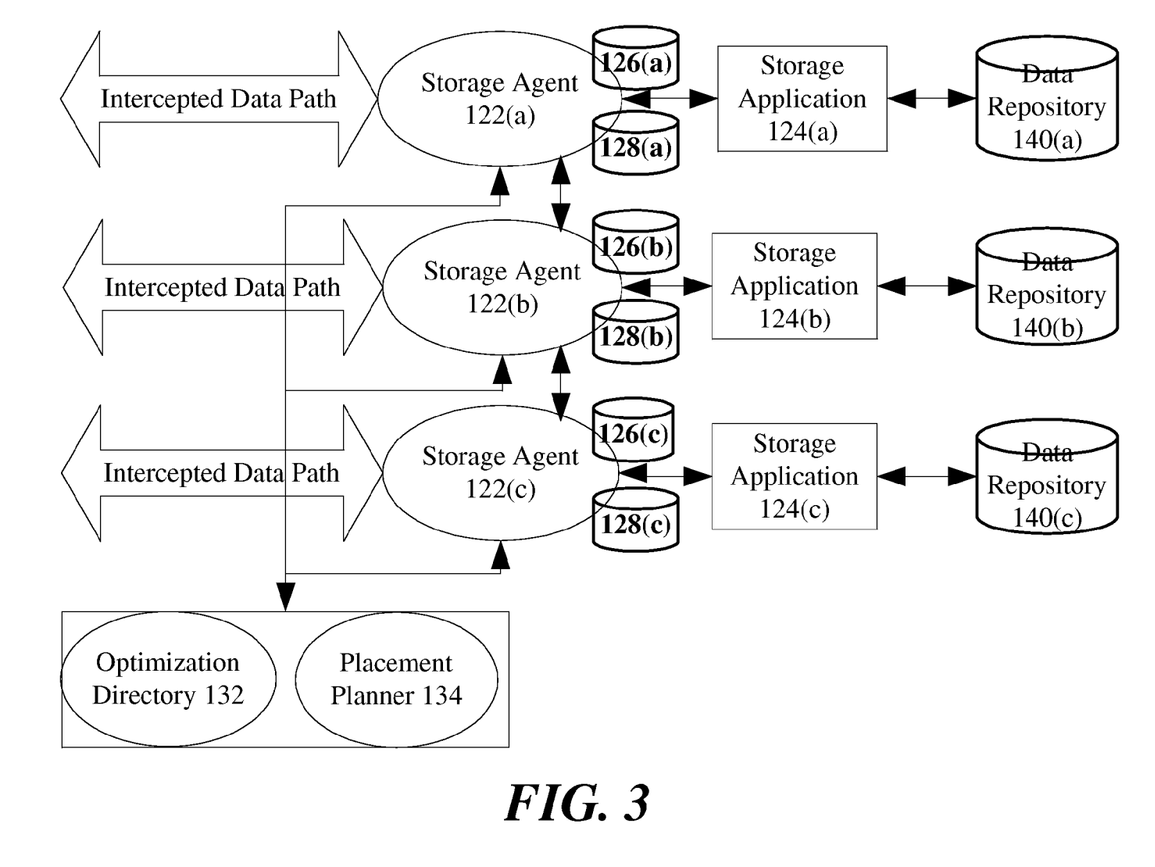
FIG. 3 is a block diagram of an exemplary detailed embodiment of a structured storage system for reducing data redundancy while maintaining desirable QoS levels.

In the above disclosure, one or more aspects and features of an exemplary data storage optimization system are disclosed in general terms. Referring to FIG. 3, in the following, more detailed embodiments and features are disclosed for the purpose of full disclosure. It is noteworthy, however, that the general nature of the foregoing disclosure fully supports the broadest claim scope without the limitations associated with the exemplary detailed disclosure provided below. As such, the particular implementations referred to in the following shall not be construed to limit the scope of the claimed subject matter.

Storage Agent—As noted above, the storage agent 122 intercepts incoming data transferred to a storage application 124 and maintains a meta data repository 128 which includes information about the costs to insert, retain and retrieve target data in a locally managed repository, as well as the method to retrieve the target data. In addition storage agent 122 uses the storage medium 126 to store the target data before the target data is processed by the storage application 124. The storage agent 122 may be specific to the type of storage application 124 (e.g., TSM, Diligent, HardDisk, etc.). An exemplary storage agent 122 manages or performs the events provided below, without limitation.

Interception of an external storage request: the storage agent 122 intercepts the incoming request submitted by a client application 114 (i.e., the requester), calculates the related deduplication hashes, stores the data temporarily in a storage medium 126 and updates the meta data repository 128. Storage agent 122 then updates optimization directory 132 and notifies placement planner 134 that a data item was added to the storage medium 126.

Interception of an external retrieval request: the storage agent 122 intercepts data retrieval requests sent to the storage application 124 and reads the requested data from the storage application 124. Before passing the data to the requester, storage agent 122 determines whether stubs that identify the data are to be replaced. Within the context of this disclosure the term stub refers to an identifier that points to a location where the data is stored. The identifier may be calculated by way of a pseudo-random identification mechanism (e.g., a hash value), an indexing mechanism, or other suitable method. For each stub, the storage agent 122 consults with the optimization directory 132 to determine the storage location or locations of a data item. Depending on the QoS specified by the requester, storage agent 122 selects one or more appropriate locations to retrieve the data of each stub and replaces the stubs and returns the data to the requester.

Interception of an external deletion request: the storage agent 122 intercepts delete requests sent to the storage application 124. The storage agent 122 retrieves the data to be deleted from the storage application 124 and copies the items containing data (excluding the stubs) to the storage medium 126. Then storage agent 122 deletes the data from the storage application 124 and updates the meta data repository 128. The storage agent 124 then updates optimization directory 132 and notifies placement planner 134 that data items were added to the storage medium 126.

Placement planner copy instruction: the placement planner 134 asks the storage agent 122 to copy a data item. The request may comprise the id of the data item, the source location and the desired storage locations. The storage agent 122 reads the data from the source and stores the data into the specified locations (e.g., FS, disk, tape, off-line tape). The storage agent 122 updates the meta data repository 128 and optimization directory 132 with the new locations for the data item.

Placement planner removal instruction: the placement planner 134 asks the storage agent 122 to remove a data item from a given location. If the location corresponds to the storage agent 122 storage medium 126 then the data item is deleted. Otherwise, the data item is replaced with a stub. Finally storage agent 122 updates the internal meta data repository 128 and optimization directory 132 to remove the corresponding location for the data item.

Placement planner costs request: the placement planner 134 asks the storage agent 122 for a vector of costs to insert, retain and retrieve data from the supported storage types. The placement planner 134 sends back the requested vector. Storage agent 122 may also push vector data periodically or upon modification.

Data item retrieval request by another storage agent: Consider a scenario where a storage agent $122_{(b)}$ requests a data item from a storage agent $122_{(a)}$. Storage agent $122_{(a)}$ resolves the data item location and retrieval method consulting the internal meta data repository $128_{(a)}$. Storage agent $122_{(a)}$ then retrieves the data and returns it to storage agent $122_{(b)}$.

Optimization Directory—The optimization directory 132 provides services to query and update the information stored therein. The optimization directory 132 may be implemented as a centralized component or a distributed component.

Placement Planner—The placement planner 134 is utilized to optimize the location of data items according to a calculated QoS across a storage platform. Placement planner 134 acts upon 3 events:
1. Periodic optimization;
2. When data is inserted into storage medium 126 by storage agent 122;
3. When the cost to retain or retrieve data at a storage agent 122 has changed.

The placement planner 134 consults the optimization directory 132 and calculates one or more cost efficient locations (e.g., the most cost effective location) for each data item preserving the compound QoS by employing a variety of techniques (e.g., based on operational research). The placement planner 134 relocates data items using the copy and removes storage agent 122 mechanisms. The placement planner 134 may also consider the cost of operations needed to optimize storage costs (e.g. cost to remove, add or move a data item).

In the exemplary embodiment disclosed in further detail below, certain identifiers (e.g., DataItemId) are disclosed by way of example as utilizing a hash value referred to as a deduplication hash (i.e., dedup hash). It is noteworthy, however, that such identifiers may be implemented in the form of a pseudo-random value, an indexing value, or other suitable unique value generator.

Interfaces and Data Formats—Storage Agent APIs
Interception:
In one embodiment, there is no specific application programming interface (API). The storage agent 122 implementation intercepts the requests sent to the storage application 124 and forwards them when needed.

CopyDataItem
1. DataItemId: dedup hash used as unique identifier for the data item
2. Source: location id and location type to copy the data item from
3. Destination: location type to copy the data item to RemoveDataItem
1. DataItemId: dedup hash used as unique identifier for the data item
2. Location: location type to remove the data item from RetrieveDataItem
1. DataItemId: dedup hash used as unique identifier for the data item
2. LocationType: location type to retrieve the data item from
3. Returns: undeduped data GetCosts
1. Returns: vector of costs; each vector item contains
    a. Location type
    b. InsertionCost
    c. RetentionCost
    d. RetrievalCost Interfaces and Data Formats—Optimization Directory API
QueryDataItemBystorage Agent 122
1. DataItemId: dedup hash used as unique identifier for the data item
2. Returns: all the locations for the given data item, with RetrievalCost for each QueryDataItemByplacement Planner 134
1. DataItemId: dedup hash used as unique identifier for the data item
2. Returns: all the locations for the given data item, with RetrievalCost and RetentionCost for each.

AddDataItemLocation
1. DataItemId: dedup hash used as unique identifier for the data item
2. Location: location id and location type to add or remove
3. QoS: QoS vector corresponding to the location RemoveDataItemLocation
1. DataItemId: dedup hash used as unique identifier for the data item
2. Location: location id and location type to add or remove
3. QoS: QoS vector corresponding to the location Interfaces and Data Formats—Placement Planner API
DataItemAdded
1. DataItemId: dedup hash used as unique identifier for the data item
2. Location: location id and location type where the data item was added MDR (Meta Data Record)
MDRs are stored in the storage agent 122 meta data repository 128. Each record may comprise the following fields:
1. DataItemId: dedup hash used as unique identifier for the data item
2. Vector of stored locations; for each location:
    a. LocationType: location type (internal storage, FS, Disk, V-Table, Table, etc.)
    b. Method out: method required to retrieve the data item
    c. Params out: parameters required to retrieve the data item
    d. Cost to retain: QoS vector to retain the data
    e. Cost to retrieve: QoS vector to retrieve the data
3. List of requested QoS: each entry contains a QoS of an external insertion request Storage Data Record (SDR)
SDRs are stored in the storage agent 122 storage medium 126. Each record may comprises the following fields:
1. DataItemId: dedup hash used as unique identifier for the data item
2. Data: full data for the item Optimization Directory Record
1. DataItemId: dedup hash used as unique identifier for the data item.
2. List of locations. For each location
    a. Location ID
    b. Location type (e.g., FS, Disk, V-Table, Table)
    c. RetentionCost (vector)
    d. RetrievalCost (vector)
3. Requested compound QoS: QoS vector compound by all the QoS vectors requested when the data item was inserted.

Terminology
QoS vector: a vector in which each field is a different QoS aspect.

| Power | MIPS/CPU | Memory | Bandwidth | Compliance Support | LTDP Support | Money ($) | Latency (ms) |
|---|---|---|---|---|---|---|---|

Compound QoS: Merged QoS vectors. Each field must satisfy the corresponding QoS aspects in all merged QoS vectors.

Storage application: applications used to store data (e.g. TSM, CM8, FileNet, File System, DBMS, etc.)

Location Type/Repository: one of the storage repositories managed by a single storage application 124 (e.g. memory, disk, file, folder, RAID, Tape, V-Tape, etc).

Storage Cloud: group of servers (virtual or physical) holding several repositories located at different geographic locations. Some cases might contain only one server, one location, one repository or one service.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
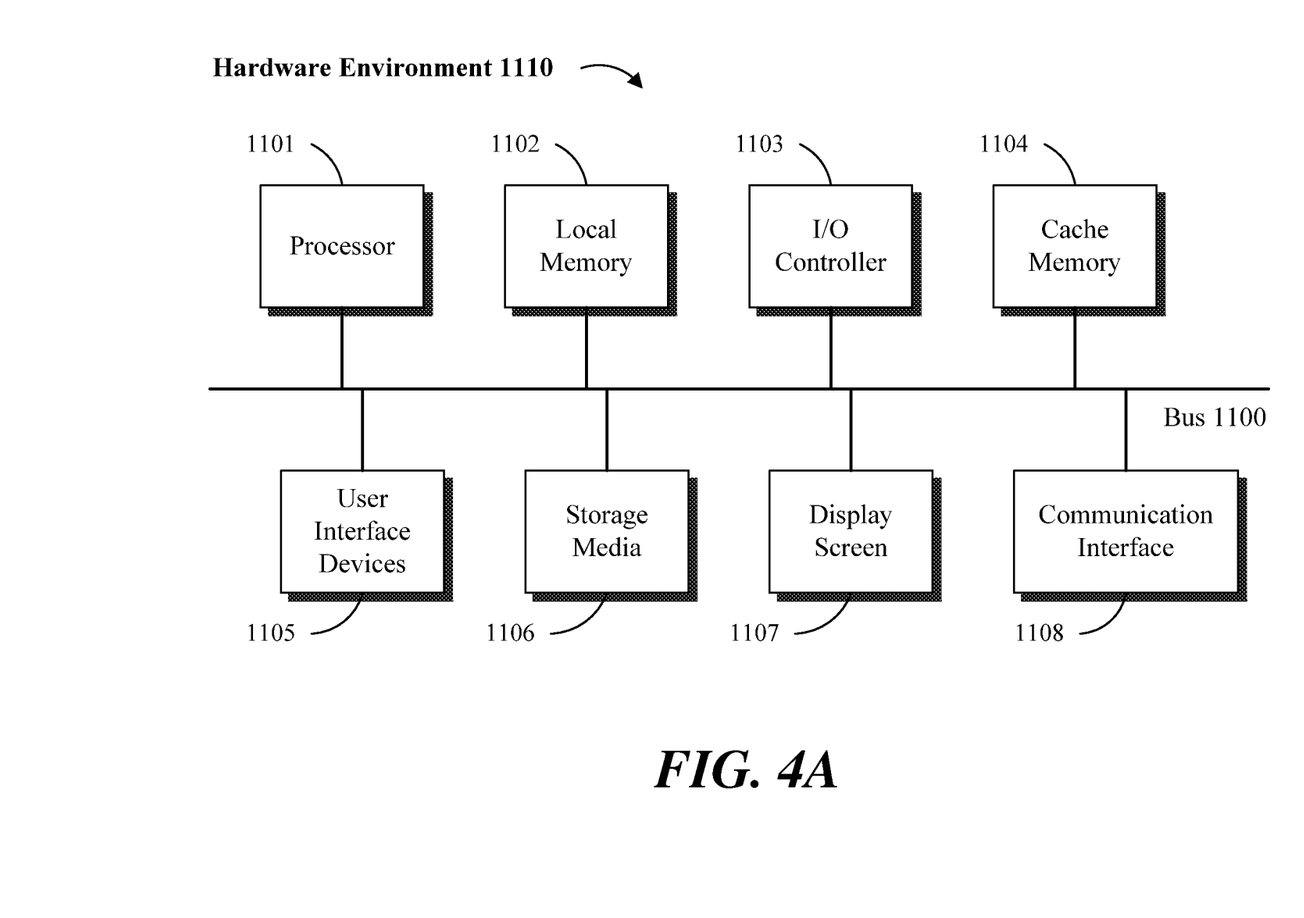
FIGS. 4A and 4B are block diagrams of hardware and software environments, in accordance with one or more embodiments.
Figure 4B:
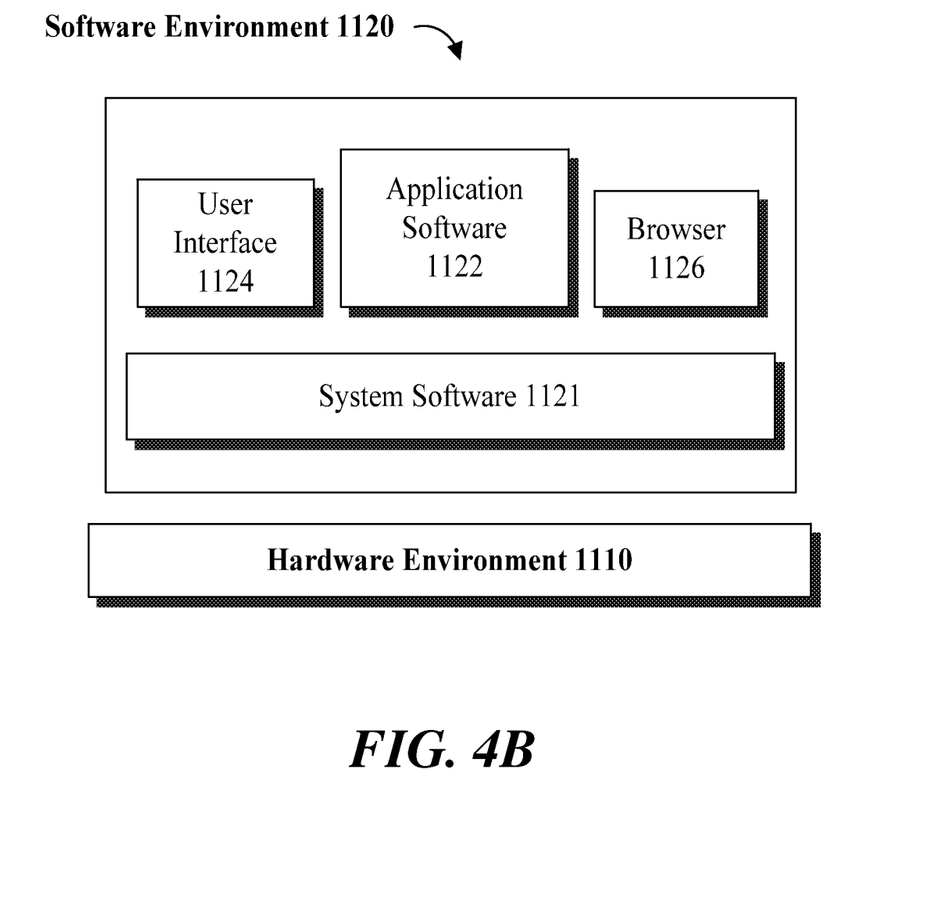

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer-usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. An embodiment including hardware or software or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wire line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for optimizing data storage among a plurality of data storage repositories, the method comprising:
    processing a data request submitted by a first application for storing data on one or more data storage mediums connected to a distributed communications network;
    determining a number and location of duplicate copies of the data to be maintained on more than one storage medium so that established quality of service requirements associated with the first application are met;
    managing duplicate copies of the data on said one or more data storage mediums to meet the established quality of service requirements for a group of applications that also use duplicated copies of said data while servicing the data request submitted by the first application,
    wherein managing the duplicate copies of the data comprises deduplicating copies of the data on one or more data storage mediums, in response to determining that the deduplication does not adversely affect one or more of the following in the distributed communication network: data access latency, data recovery reliability, data storage costs, and data storage bandwidth, wherein said one or more data storage mediums are positioned at various data paths in the distributed communications network such that maintaining duplicate copies of the data in at least some of the one or more data storage mediums helps at least one of data access latency, data recovery reliability, data storage costs, and data storage bandwidth in the distributed communications network, and wherein said deduplicating comprises determining a unique ID associated with the data and a location type to remove the data item from.

2. The method of claim 1 wherein duplicate copies of the data are managed in a way to reduce data redundancy in copies of the data stored on the one or more data storage mediums in an effort to reduce costs associated with storing or retaining the data on said storage mediums.

3. The method of claim 1 wherein the managing of the duplicate copies of the data comprises storing the duplicate copies of the data on more than one data storage medium.

4. The method of claim 1 wherein the managing of the duplicate copies of the data comprises removing the duplicate copies of the data from one or more data storage medium.

5. The method of claim 1 wherein storage location of duplicate copies of the data is maintained in a directory, wherein said directory is updated when the data request is serviced.

6. The method of claim 1 wherein the data request is submitted in association with meta data, wherein the meta data defines quality of service requirements for the data.

7. The method of claim 6 wherein the meta data is stored in a meta data repository so that entries in an optimization directory are updated based on content of the meta data repository.

8. The method of claim 7 wherein the optimization directory comprises information about location of storage of the data and corresponding duplicates for the data.

9. The method of claim 7 wherein the optimization directory comprises information about quality of service associated with the data with respect to location of storage of the data among said one or more storage repositories.

10. The method of claim 1 wherein the data is stored in a temporary storage medium until it is determined how the duplicate copies of the data are to be managed.

11. The method of claim 1 wherein the unique ID associated with the data is determined based on a hash value.

12. The method of claim 1 wherein the unique ID associated with the data is determined based a pseudo-random value or an indexing value.

13. A system for optimizing data storage among a plurality of data storage repositories, the system comprising:
a logic unit to process a data request submitted by a first application for storing data on one or more data storage mediums connected to a distributed communications network;
a logic unit to determine a number and location of duplicate copies of the data to be maintained on more than one storage medium so that established quality of service requirements are met associated with the first application; and
a logic unit to manage duplicate copies of the data on said one or more data storage mediums to meet the established quality of service requirements for a group of applications that also use duplicated copies of said data while servicing the data request submitted by the first application, wherein managing the duplicate copies of the data comprises deduplicating copies of the data on one or more data storage mediums, in response to determining that the deduplication does not affect one or more of the following in the distributed communication network: data access latency, data recovery reliability, data storage costs, and data storage bandwidth,
wherein said one or more data storage mediums are positioned at various data paths in the distributed communications network such that maintaining duplicate copies of the data in at least some of the one or more data storage mediums helps at least one of data access latency, data recovery reliability, data storage costs, and data storage bandwidth in the distributed communications network, and
wherein said deduplicating comprises determining a unique ID associated with the data and a location type to remove the data item from.

14. The system of claim 13 wherein duplicate copies of the data are managed in a way to reduce data redundancy in copies of the data stored on the one or more data storage mediums in an effort to reduce costs associated with storing or retaining the data on said storage mediums.

15. The system of claim 13 wherein the managing of the duplicate copies of the data comprises storing the duplicate copies of the data on more than one data storage medium.

16. The system of claim 13 wherein the managing of the duplicate copies of the data comprises removing the duplicate copies of the data from one or more data storage medium.

17. The system of claim 13 wherein storage location of duplicate copies of the data is maintained in a directory, wherein said directory is updated when the data request is serviced.

18. The system of claim 13 wherein the data request is submitted in association with meta data, wherein the meta data defines quality of service requirements for the data.

19. The system of claim 18 wherein the meta data is stored in a meta data repository so that entries in an optimization directory are updated based on content of the meta data repository.

20. The system of claim 19 wherein the optimization directory comprises information about location of storage of the data and corresponding duplicates for the data.

21. The system of claim 19 wherein the optimization directory comprises information about quality of service associated with the data with respect to location of storage of the data among said one or more storage repositories.

22. The system of claim 13 wherein the data is stored in a temporary storage medium until it is determined how the duplicate copies of the data are to be managed.

23. The system of claim 13 wherein the unique ID associated with the data is determined based on a hash value.

24. The system of claim 13 wherein the unique ID associated with the data is determined based a pseudo-random value or an indexing value.

25. A computer program product comprising a non-transitory computer readable storage medium having a computer readable program, wherein the computer readable program when executed on a computer causes the computer to:
process a data request submitted by a first application for storing data on one or more data storage mediums connected to a distributed communications network;
determine a number and location of duplicate copies of the data ae to be maintained on more than one storage medium so that established quality of service requirements associated with the first application are met; and
manage duplicate copies of the data on said one or more data storage mediums to meet the established quality of service requirements for a group of applications that also use duplicated copies of said data while servicing the data request submitted by the first application, wherein managing the duplicate copies of the data comprises deduplicating copies of the data on one or more data storage mediums, in response to determining that the deduplication does not adversely affect one or more of the following in the distributed communication network: copies of the data on one or more data storage mediums based on factors that at least affect one or more of the following data access latency, data recovery, reliability, data storage costs, and data storage bandwidth, wherein said one or more data storage mediums are positioned at various data paths in the distributed communications network such that maintaining duplicate copies of the data in at least some of the one or more data storage mediums helps at least one of data access latency, data recovery reliability, data storage costs, and data storage bandwidth m the distributed communications network, and wherein said deduplicating comprises determining a unique ID associated with the data and a location type to remove the data item from.

26. The computer program product of claim 25, wherein duplicate copies of the data are managed in a way to reduce data redundancy in copies of the data stored on the one or more data storage mediums in an effort to reduce costs associated with storing or retaining the data on said storage mediums.

27. The computer program product of claim 25, wherein the managing of the duplicate copies of the data comprises storing the duplicate copies of the data on more than one data storage medium.

28. The computer program product of claim 25, wherein the managing of the duplicate copies of the data comprises removing the duplicate copies of the data from one or more data storage medium.

29. The computer program product of claim 25, wherein storage location of duplicate copies of the data is maintained in a directory, wherein said directory is updated when the data request is serviced.

* * * * *